United States Patent
Moriyama et al.

(10) Patent No.: US 9,209,905 B2
(45) Date of Patent: Dec. 8, 2015

(54) OPTICAL COMMUNICATION APPARATUS

(71) Applicant: FUJITSU COMPONENT LIMITED, Tokyo (JP)

(72) Inventors: Satoshi Moriyama, Tokyo (JP); Osamu Daikuhara, Tokyo (JP); Takeshi Okuyama, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/188,769

(22) Filed: Feb. 25, 2014

(65) Prior Publication Data
US 2014/0241733 A1 Aug. 28, 2014

(30) Foreign Application Priority Data

Feb. 26, 2013 (JP) ................................. 2013-036449

(51) Int. Cl.
*G02B 6/32* (2006.01)
*H04B 10/60* (2013.01)
*H04B 10/50* (2013.01)
*G02B 6/42* (2006.01)

(52) U.S. Cl.
CPC .............. *H04B 10/60* (2013.01); *G02B 6/4206* (2013.01); *G02B 6/4214* (2013.01); *H04B 10/50* (2013.01)

(58) Field of Classification Search
CPC ..... G02B 6/4214; G02B 6/322; G02B 6/4248
USPC .................. 385/33, 88–94; 398/138
See application file for complete search history.

(56) References Cited

U.S. PATENT DOCUMENTS

| | | | | |
|---|---|---|---|---|
| 6,987,619 B2 * | 1/2006 | Kornrumpf et al. | .......... | 359/619 |
| 7,025,511 B2 * | 4/2006 | Nakajima | .......... | 385/93 |
| 7,373,051 B2 * | 5/2008 | Ide et al. | .......... | 385/47 |
| 8,737,784 B2 * | 5/2014 | Kawai | .......... | 385/47 |
| 8,783,971 B2 * | 7/2014 | Miyatake | .......... | 385/93 |
| 9,031,363 B2 * | 5/2015 | Tseng | .......... | 385/33 |
| 2004/0126064 A1 * | 7/2004 | Vandentop et al. | .......... | 385/49 |
| 2006/0215982 A1 * | 9/2006 | Umezawa | .......... | 385/146 |
| 2009/0316003 A1 * | 12/2009 | Hirsa et al. | .......... | 348/187 |
| 2010/0104290 A1 * | 4/2010 | Nobuhara et al. | .......... | 398/82 |
| 2011/0284979 A1 * | 11/2011 | Mizuno | .......... | 257/432 |
| 2013/0168537 A1 * | 7/2013 | Shin | .......... | 250/216 |
| 2014/0246566 A1 * | 9/2014 | Maruyama | .......... | 250/208.1 |

FOREIGN PATENT DOCUMENTS

JP 2006-091753 4/2006

* cited by examiner

*Primary Examiner* — Ellen Kim
(74) *Attorney, Agent, or Firm* — IPUSA, PLLC

(57) ABSTRACT

An optical communication apparatus includes a substrate having a through hole; an optical element which includes a light terminal for receiving or sending light and is mounted on a surface of the substrate so that the light terminal faces an opening of the through hole; a light guide member which includes a first lens facing the light terminal of the optical element, a surrounding portion which surrounds a periphery of the first lens on a side of the opening of the through hole, and a guide portion which is provided inside the through hole and guides the light between the opening and another opening of the through hole; and a light waveguide which is arranged on a side of another surface of the substrate and includes a light guide optically connected to the light guide member on a side of the another opening of the through hole.

8 Claims, 8 Drawing Sheets

OPTICAL COMMUNICATION APPARATUS

CROSS-REFERENCE TO RELATED APPLICATIONS

This patent application is based upon and claims the benefit of priority of Japanese Patent Application No. 2013-036449 filed on Feb. 26, 2013 the entire contents of which are incorporated herein by reference.

BACKGROUND OF THE INVENTION

1. Field of the Invention

The present invention relates to an optical communication apparatus.

2. Description of the Related Art

An exemplary Integrated Circuit (IC) chip mounting substrate disclosed in Japanese Laid-open Patent Publication No. 2006-091753 is formed by laminating a conductor circuit and an interlayer resin insulating layer on both sides of a substrate, mounting an optical element, and providing a light path for transmitting a light signal. In this exemplary Integrated Circuit (IC) chip mounting substrate, an optical element sealing layer is provided around and contacts an outer periphery of the optical element.

In a case where a sealing resin exists around an optical element, optical characteristics may be affected to degrade reliability.

SUMMARY OF THE INVENTION

According to an aspect of the present invention, there is provided an optical communication apparatus including a substrate having a through hole; an optical element which includes a light terminal for receiving or sending light and is mounted on a surface of the substrate so that the light terminal faces an opening of the through hole; a light guide member which includes a first lens facing the light terminal of the optical element, a surrounding portion which surrounds a periphery of the first lens on a side of the opening of the through hole, and a guide portion which is provided inside the through hole and guides the light between the opening of the through hole and another opening of the through hole; and a light waveguide which is arranged on a side of another surface of the substrate and includes a light guide optically connected to the light guide member on a side of the another opening of the through hole.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF EMBODIMENTS

A description is given below, with reference to FIG. 1 through FIG. 8C of embodiments of the present invention.

Where the same reference symbols are attached to the same parts, repeated description of the parts is omitted.

Figure 1:
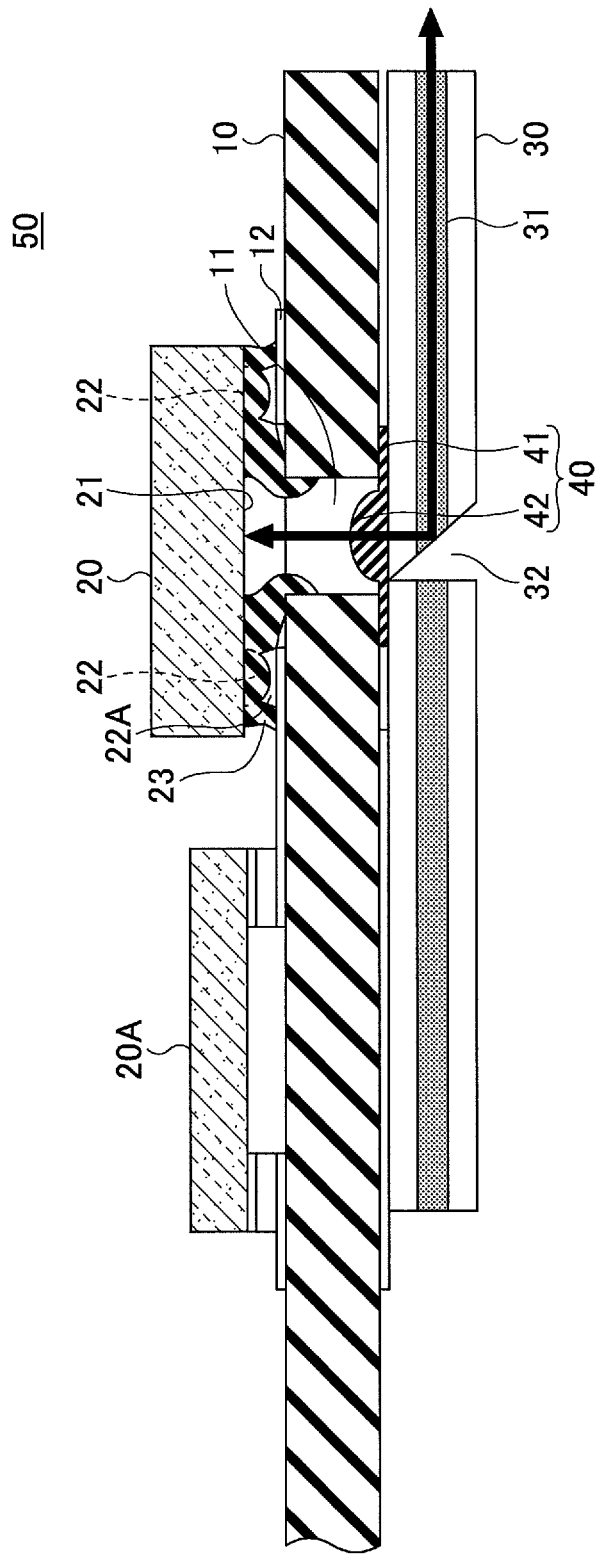
FIG. 1 is a cross-sectional view of an exemplary optical communication apparatus.

Referring to FIG. 1, an exemplary optical communication apparatus is described.

FIG. 1 is a cross-sectional view of an exemplary optical communication apparatus.

The exemplary optical communication apparatus 50 includes a substrate 10, an optical element 20, a light waveguide 30, and a lens 40.

The substrate 10 is provided with an optical element 20 and functions as a reinforcing layer for reinforcing the light waveguide 30. The substrate 10 may be, for example, a flexible circuit board (FPC). The FPC is, for example, a resin substrate made of polyimide or the like.

A wiring 12 for supplying electric power to the optical element 20 or for transmitting an electric signal or the like is formed on the upper surface of the substrate 10.

The substrate 10 has a through hole 11 which penetrates through the substrate 10 in the thickness direction of the substrate 10. A light terminal 21 of the optical element 20 is provided on the upper side of the through hole 11. The lens 40 is positioned on the lower side of the through hole 11. A light path, which is indicated by an arrow, is formed between the light terminal 21 and the lens 40.

The optical element 20 is, for example, a laser element of emitting light, a photodiode of receiving light and converting the light to an electrical signal, or an element of emitting or receiving light. The optical element 20 is mounted on one surface (i.e., the upper surface in FIG. 1) of the substrate 10 by a bump 22 and a sealing resin 23 using flip chip mounting.

By the flip chip mounting of the optical element 20 onto the substrate 10, the bump 22 joined to a terminal of the optical element 20 is electrically connected to the wiring 12 of the substrate 10 using ultrasonic bonding or the like. Since the optical element 20 is firmly joined to the substrate 10 using the bump 22 and the optical element 20 generates heat, stress is caused in a connecting portion between the optical element 20 and the substrate 10 by expansion caused by the generated heat or the like. A part of plating formed on the surface of the wiring 12 is molten and a plating layer 22A is formed between the bump 22 and the wiring 12 of the substrate 10.

An electronic part 20A may be mounted on the substrate 10 in addition to the optical element 20.

The light waveguide 30 is shaped like a sheet and includes a light guide and a mirror 32. The light guide 31 transmits light like an optical fiber including a core layer having a high refractive index and a cladding layer having a low refractive index. The mirror 32 is formed by providing a groove having a cross-sectional shape of a triangle in the light waveguide 30.

As illustrated in FIG. 1, the light waveguide 30 has a surface formed at an angle of 45 degrees relative to the light guide 31 so that the light transmitted through and inside the light guide 31 undergoes total reflection and is turned by 90 degrees so as to be transmitted to the lens 40.

The light waveguide 30 is bonded onto the surface of the substrate 10.

The lens 40 includes a seat portion 41 and a lens portion 42 formed in the center of the seat portion 41. Because the lens 40 is positioned at the lower end of the through hole 11, the light path between the lens 40 and the light terminal 20 of the optical element 20 is formed by the through hole 11 and a gap between the optical element 20 and the substrate 10.

In a process of manufacturing the exemplary optical communication apparatus 50, when the optical element 20 undergoes the flip chip mounting, the sealing resin 23 may flow from an upper end side into the through hole 11.

This is because there exists no member restricting an inflow of the sealing resin 23 on the upper end side of the through hole 11.

As such, if the sealing resin 23 flows into the through hole 11, the light path between the light terminal 21 of the optical element 20 and the lens 40 may be interrupted by the sealing resin 23. When the light path between the light terminal 21 and the lens 40 is interrupted, a bad influence may occur in optical communications between the optical element 20 and the light waveguide 30 to degrade reliability of the optical communication apparatus 50.

There may be a case where a highly accurate alignment accuracy is required in mounting the optical element 20. In this case, a highly accurate mounter is used. However, if a bonding process of bonding the sealing resin 23 when the optical element 20 is mounted is cumbersome, the finishing may be unstable and reliability of products may be degraded.

Hereinafter, an optical communication apparatus of an embodiment of the present invention is described.

First Embodiment

Figure 2A:
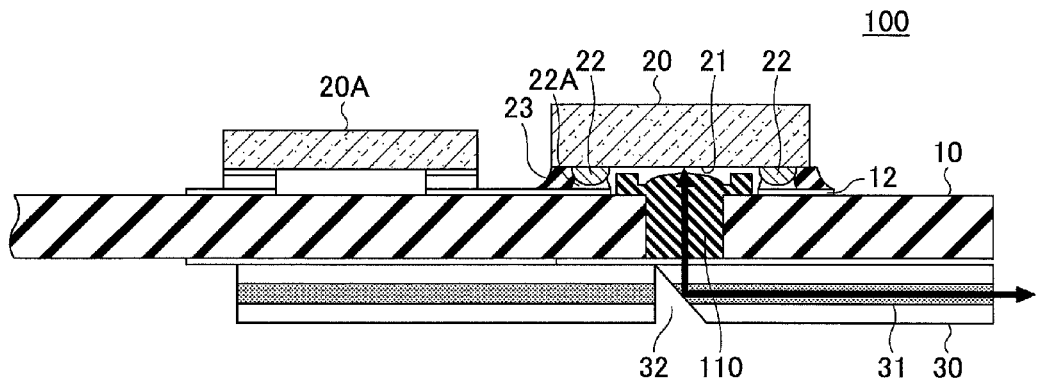
FIG. 2A is a cross-sectional view of an optical communication apparatus 100 of a first embodiment.
Figure 2B:
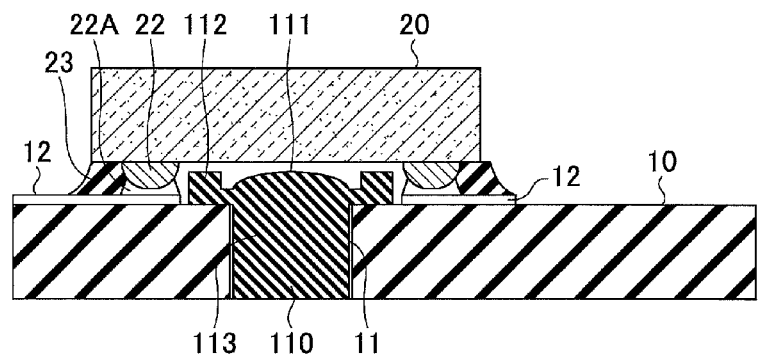
FIG. 2B is a cross-sectional view of the optical communication apparatus 100 of the first embodiment.
Figure 2C:
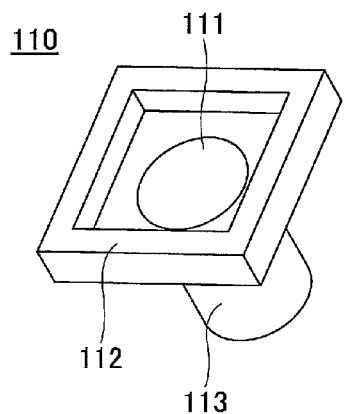
FIG. 2C is a perspective view of a lens of the first embodiment.

FIGS. 2A-2C illustrate an optical communication apparatus 100 of a first embodiment of the present invention. Hereinafter, the same reference symbols are attached to structural elements similar to those of the exemplary optical communication apparatus 50, and description of those structural elements is omitted.

As illustrated in FIG. 2A, the optical communication apparatus 100 of the first embodiment includes a substrate 10, an optical element 20, a light waveguide 30, and a lens 110.

As illustrated in FIGS. 2B and 2C, the lens 110 includes a lens portion 111, a surrounding portion 112, and a guide portion 113. The lens 110 is an example of a light guide.

The lens portion 111, the surrounding portion 112, and the guide portion 113 are made of a resin such as polyimide and are integrally formed. The lens 110 is inserted into the through hole 11 and bonded to the through hole 11.

The lens portion 111 is formed at one end of the guide portion 113 (the upper end in FIG. 2) and is surrounded by the surrounding portion 112.

Referring to FIG. 2C, the surrounding portion 112 is formed to surround the periphery of the lens portion 111. The surrounding portion 112 outwardly extends relative to the lens portion 111 and the guide portion 113 in the plan view of the surrounding portion 112, and is a wall shaped like a rectangle around the lens portion 111 in the plan view of the surrounding portion 112.

As illustrated in FIGS. 2A and 2B, the height of the surrounding portion 112 is set so that the upper end of the surrounding portion 112 does not contact the lower surface of the optical element 20 under a state where the lens 110 is mounted on the substrate 10.

The guide portion 113 is a cylindrical member formed with the lens portion 111 and the surrounding portion 112 at one end of the guide portion 113. The diameter of the guide portion 113 is matched with the diameter of the cylindrical through hole formed in the substrate 10. The guide portion 113 is fit into and attached to the through hole 11.

The guide portion 113 in inserted into the through hole 11 of the substrate 10. The position of the lower end of the guide portion 113 is aligned with the position of the mirror 32 of the light waveguide 30, and the light path is formed between the lens portion 111 and the light guide 31. Further, the length of the guide portion 113 is set so that the surface of the lower end of the guide portion 113 is the same as the lower surface of the substrate 10.

Within the optical communication apparatus 100 of the first embodiment, when the optical element 20 is mounted on the substrate 10 using flip chip mounting, the surrounding portion 112 interrupts the sealing resin 23. Therefore, it is possible to prevent the sealing resin 23 from flowing into the through hole 11 unlike the exemplary optical communication apparatus 50.

Therefore, within the first embodiment, the light path between the optical element 20 and the light waveguide 30 is prevented from being interrupted by the sealing resin 23, and the optical communication apparatus 100 having high reliability can be provided.

Further, the lens 110 may be integrally formed with the substrate 10. When the lens 110 and the substrate 10 are integrally formed, the lens 110 and the substrate 10 are made by a transparent resin such as polyimide. In this case where the lens 110 and the substrate 10 are integrally formed, processes of aligning the lens 110, coating a bond, hardening the bond, and separating a separator for attaching the lens 110 can be omitted.

Second Embodiment

FIGS. 3A-3D illustrate an optical communication apparatus 200 of a second embodiment of the present invention. Hereinafter, the same reference symbols are attached to structural elements similar to those of the optical communication apparatus 100 of the first embodiment, and description of those structural elements is omitted.

Figure 3A:
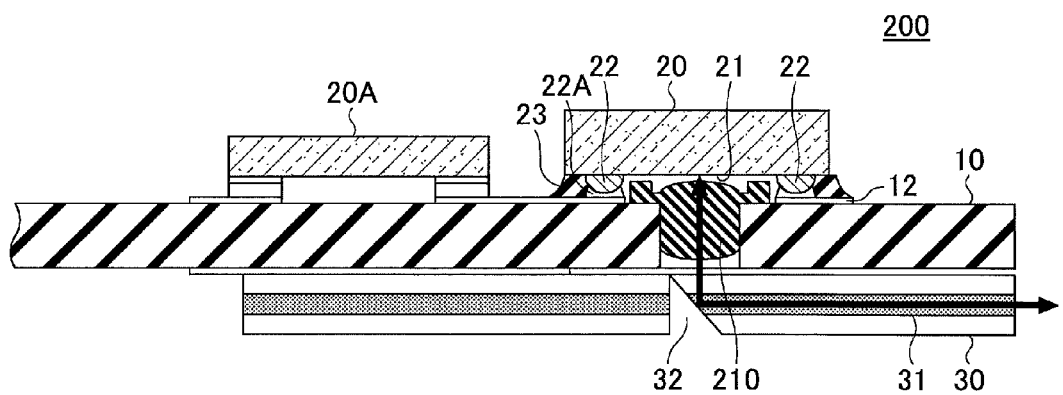
FIG. 3A is a cross-sectional view of an optical communication apparatus 200 of a second embodiment.

As illustrated in FIG. 3A, the optical communication apparatus 200 includes the substrate 10, the optical element 20, the light waveguide 30, and a lens 210. In the optical communication apparatus 200 of the second embodiment, the lens 110 of the optical communication apparatus 100 of the first embodiment is replaced by the lens 210.

Figure 3B:
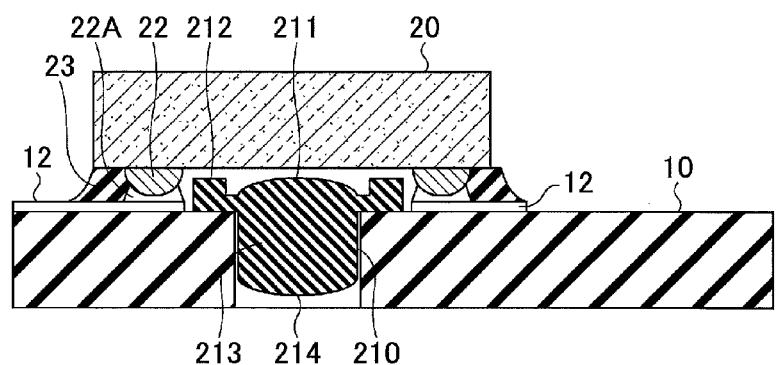
FIG. 3B is a cross-sectional view of the optical communication apparatus 200 of the second embodiment.
Figure 3C:
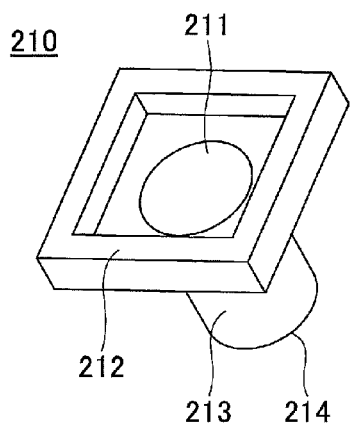
FIG. 3C is a perspective view of a lens of the second embodiment.
Figure 3D:
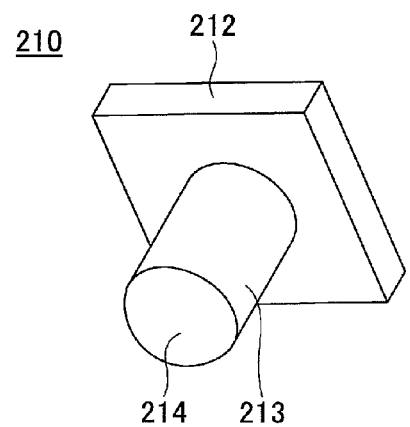
FIG. 3D is a perspective view of the lens of the second embodiment.

Referring to FIGS. 3B, 3C, and 3D, the lens 210 includes a lens portion 211, a surrounding portion 212, a guide portion 213, and a lens portion 214. The lens portion 211 and the surrounding portion 212 are similar to the lens portion 111 and the surrounding portion 112 of the first embodiment.

The guide portion 213 has the lens portion 214 at the lower end. In the guide portion 213, the lens portion 211 similar to the lens portion 111 is provided at the upper end of the guide portion 213 similar to the guide portion 113 of the first embodiment. The surface of the lens portion 214 may be on the same plane as that of the lower surface of the substrate 10 or inward offset relative to the lower surface of the substrate 10 as illustrated in FIGS. 3A and 3B.

In the optical communication apparatus 200 of the second embodiment, a light path including the lens 210 having the lens portion 214 is formed between the optical element 20 and the light waveguide 30.

In the optical communication apparatus 200 of the second embodiment, the surrounding portion 212 interrupts the sealing resin 23 when the optical element 20 is mounted on the substrate 10 using flip chip mounting. Therefore, unlike the exemplary optical communication apparatus 50, it is possible to prevent the sealing resin 23 from flowing into the through hole 11.

Therefore, within the second embodiment, the light path between the optical element 20 and the light waveguide 30 is prevented from being interrupted by the sealing resin 23, and the optical communication apparatus 200 having high reliability can be provided.

Third Embodiment

Figure 4A:
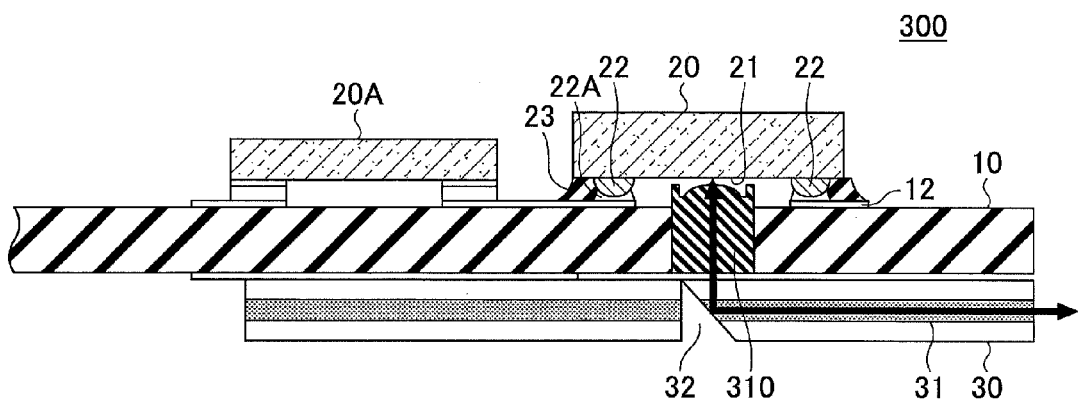
FIG. 4A is a cross-sectional view of an optical communication apparatus 300 of a third embodiment.
Figure 4B:
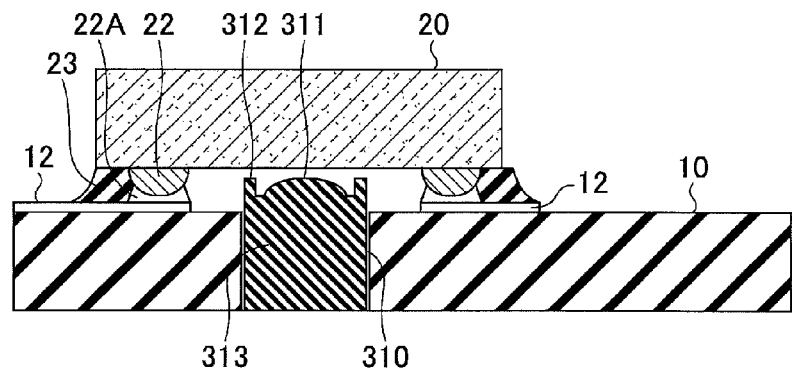
FIG. 4B is a cross-sectional view of the optical communication apparatus 300 of the third embodiment.
Figure 4C:
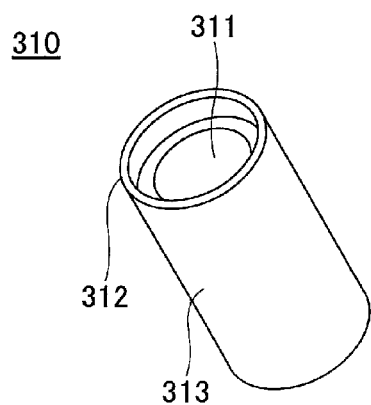
FIG. 4C is a perspective view of a lens of the third embodiment.

FIGS. 4A-4C illustrate an optical communication apparatus 300 of a third embodiment of the present invention. Hereinafter, the same reference symbols are attached to structural elements similar to those of the optical communication apparatus 100 of the first embodiment, and description of those structural elements is omitted.

As illustrated in FIG. 4A, the optical communication apparatus 300 includes the substrate 10, the optical element 20, the light waveguide 30, and a lens 310. In the optical communication apparatus 300, the lens 110 of the first embodiment is replaced by the lens 310.

Referring to FIGS. 4B and 4C, the lens 310 includes a lens portion 311, a surrounding portion 312, and a guide portion 313. The lens portion 311 is similar to the lens portion 111 of the first embodiment.

The size of the surrounding portion 312 of the lens 310 of the third embodiment has the same size of the guide portion 313 in its plan view. The surrounding portion 312 has a shape as if the outer peripheral portion of the cylindrical guide portion 313 is extended around the lens portion 311. Said differently, the surrounding portion 312 has a cylindrical wall surrounding the periphery of the lens portion 311. The height of the surrounding portion 312 is similar to the height of the surrounding portion 112 of the first embodiment.

In the optical communication apparatus 300 of the third embodiment, a light path including the lens 310 is formed between the optical element 20 and the light waveguide 30.

In the optical communication apparatus 300 of the third embodiment, the surrounding portion 312 interrupts the sealing resin 23 when the optical element 20 is mounted on the substrate 10 using flip chip mounting. Therefore, unlike the exemplary optical communication apparatus 50, it is possible to prevent the sealing resin 23 from flowing into the through hole 11.

Therefore, within the third embodiment, the light path between the optical element 20 and the light waveguide 30 is prevented from being interrupted by the sealing resin 23, and the optical communication apparatus 300 having high reliability can be provided.

Fourth Embodiment

FIGS. 5A-5D illustrate an optical communication apparatus 400 of a fourth embodiment of the present invention. Hereinafter, the same reference symbols are attached to structural elements similar to those of the optical communication apparatus 300 of the third embodiment, and description of those structural elements is omitted.

Figure 5A:
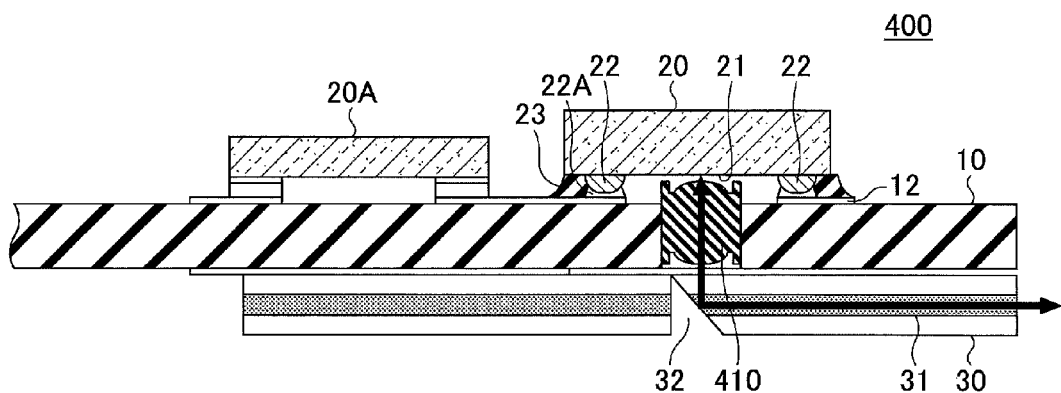
FIG. 5A is a cross-sectional view of an optical communication apparatus 400 of a fourth embodiment.

As illustrated in FIG. 5A, the optical communication apparatus 400 includes the substrate 10, the optical element 20, the light waveguide 30, and a lens 410. In the optical communication apparatus 400, the lens 310 of the third embodiment is replaced by the lens 410.

Figure 5B:
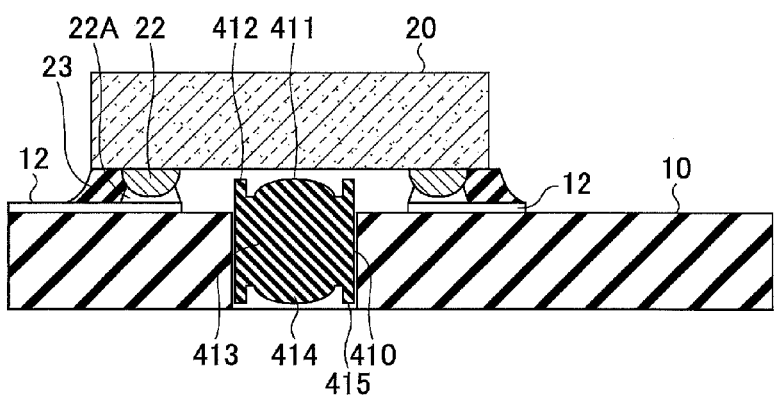
FIG. 5B is a cross-sectional view of the optical communication apparatus 400 of the fourth embodiment.
Figure 5C:
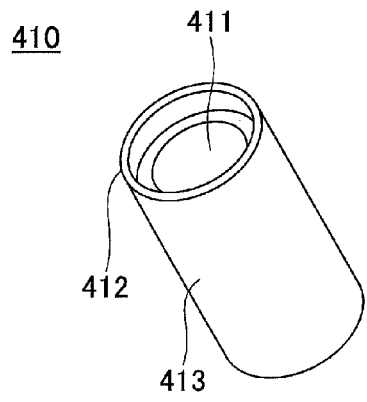
FIG. 5C is a perspective view of a lens of the fourth embodiment.
Figure 5D:
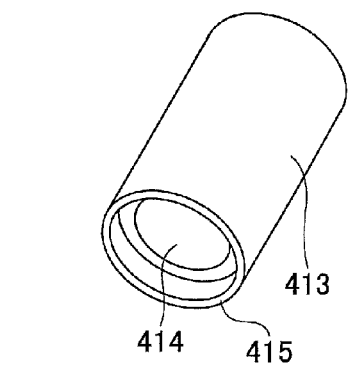
FIG. 5D is a perspective view of the lens of the fourth embodiment.

Referring to FIGS. 5B, 5C, and 5D, the lens 410 includes a lens portion 411, a surrounding portion 412, a guide portion 413, and a lens portion 414. The lens portion 411, the surrounding portion 412, and the guide portion 413 are similar to the lens portion 311, the surrounding portion 312, and the guide portion 313 of the third embodiment.

The lens 410 of the fourth embodiment of the fourth embodiment is formed by providing a lens portion 414 similar to the lens portion 311 on the lower end of the guide portion of the lens 410 and further providing a surrounding portion 415 around the lens portion 414.

In this lens 410, the lens portion 411 and the surrounding portion 412 on the upper end side has the same shapes as the lens portion 414 and the surrounding portion 415 on the lower side. Said differently, one end (upper end) and the other end (lower end) along the center axis of a cylindrical shape of the lens 410 are symmetrical.

Therefore, it is possible to install the lens 410 into the through hole 11 without considering the upper and lower ends of the lens 410.

In the optical communication apparatus 400 of the fourth embodiment, a light path including the lens 410 is formed between the optical element 20 and the light waveguide 30.

In the optical communication apparatus 400 of the fourth embodiment, the surrounding portion 412 interrupts the sealing resin 23 when the optical element 20 is mounted on the substrate 10 using flip chip mounting. Therefore, unlike the exemplary optical communication apparatus 50, it is possible to prevent the sealing resin 23 from flowing into the through hole 11.

Further, even in a case where the lens 410 is installed into the through hole 11 of the substrate 10 after turning the lens 410 upside down, the surrounding portion 415 interrupts the sealing resin 23 thereby preventing the sealing resin 23 flow flowing into the through hole 11.

Therefore, within the fourth embodiment, the light path between the optical element 20 and the light waveguide 30 is prevented from being interrupted by the sealing resin 23, and the optical communication apparatus 400 having high reliability can be provided.

Further, the lens 410 has a symmetric shape in the upper and lower sides, the lens can be installed into the through hole 11 of the substrate 10 with very easy handling.

Fifth Embodiment

FIGS. 6A-6D illustrate an optical communication apparatus 500 of a fifth embodiment of the present invention. Hereinafter, the same reference symbols are attached to structural elements similar to those of the optical communication apparatus 400 of the fourth embodiment, and description of those structural elements is omitted.

Figure 6A:
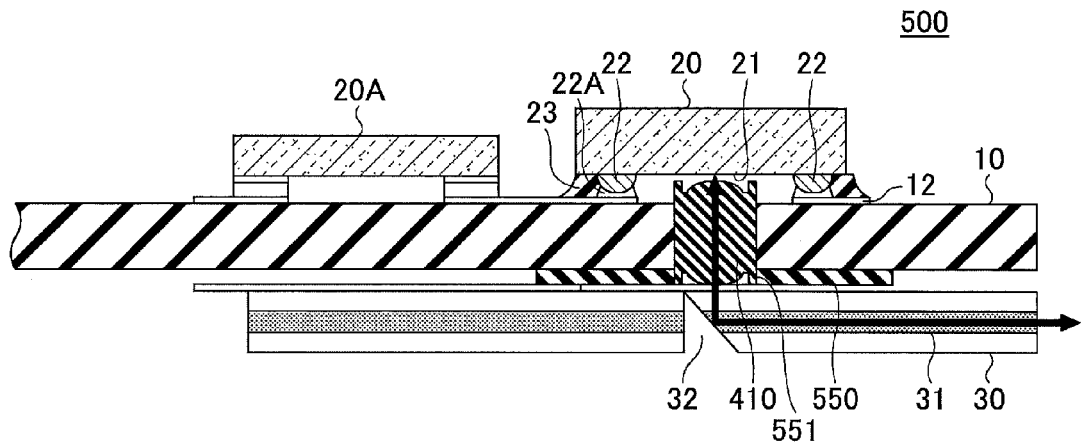
FIG. 6A is a cross-sectional view of an optical communication apparatus 500 of a fifth embodiment.
Figure 6B:
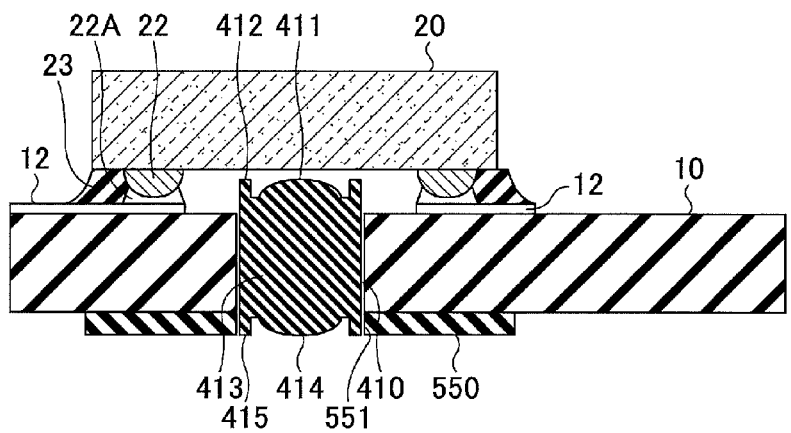
FIG. 6B is a cross-sectional view of the optical communication apparatus 500 of the fifth embodiment.

As illustrated in FIG. 6A, the optical communication apparatus 500 includes the substrate 10, the optical element 20, the light waveguide 30, a lens 410, and a plate 550. In the optical communication apparatus 500, the plate is added to and provided between the substrate 10 and the light waveguide 30 of the optical communication apparatus 400.

The plate 550 is made of a resin or a metal and has a through hole 551. The diameter of the through hole 551 is equal to the diameter of the through hole 11 in the substrate 10.

The plate 550 is provided between the substrate 10 and the light waveguide 30 and is bonded to the substrate 10 and the light waveguide 30.

Within the fifth embodiment, the lens 410 is extended in the direction of the center axis by adding the plate 550. Further, within the fifth embodiment, the surrounding portion 415 is attached to and fit into the through hole 551 of the plate 550.

Therefore, in the optical communication apparatus 500 of the fifth embodiment, the substrate 10, the light waveguide 30, and the lens 410 can be further stably retained.

Figures 6C, 6D:
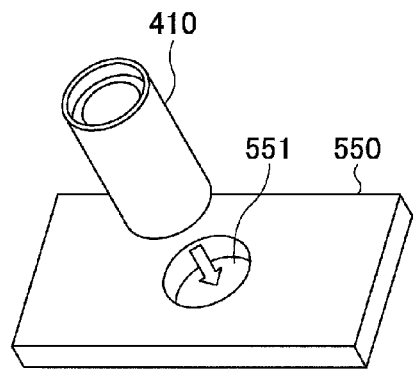
FIG. 6C is a perspective view of a lens of the fifth embodiment.
FIG. 6D is a perspective view of the lens of the fifth embodiment.

When the optical communication apparatus 500 of the fifth embodiment is assembled, the lens 410 may be attached to and fit into the through hole 551 of the plate 550 as illustrated in FIG. 6C. With this, it is easy to assemble the optical communication apparatus 500.

In the optical communication apparatus 500 of the fifth embodiment, the surrounding portion 412 interrupts the sealing resin 23 when the optical element 20 is mounted on the substrate 10 using flip chip mounting in a manner similar to the optical communication apparatus of the fourth embodiment. Therefore, it is possible to prevent the sealing resin 23 from flowing into the through hole 11.

Therefore, within the fifth embodiment, the light path between the optical element 20 and the light waveguide 30 is prevented from being interrupted by the sealing resin 23, and the optical communication apparatus 500 having high reliability can be provided.

Further, the substrate 10, the light waveguide 30, and the lens 410 can be retained in a further stable state, and it is possible to assembly the optical communication apparatus 500.

Sixth Embodiment

FIGS. 7A-7D illustrate an optical communication apparatus 600 of a sixth embodiment of the present invention. Hereinafter, the same reference symbols are attached to structural elements similar to those of the optical communication apparatus 500 of the fifth embodiment, and description of those structural elements is omitted.

Figure 7A:
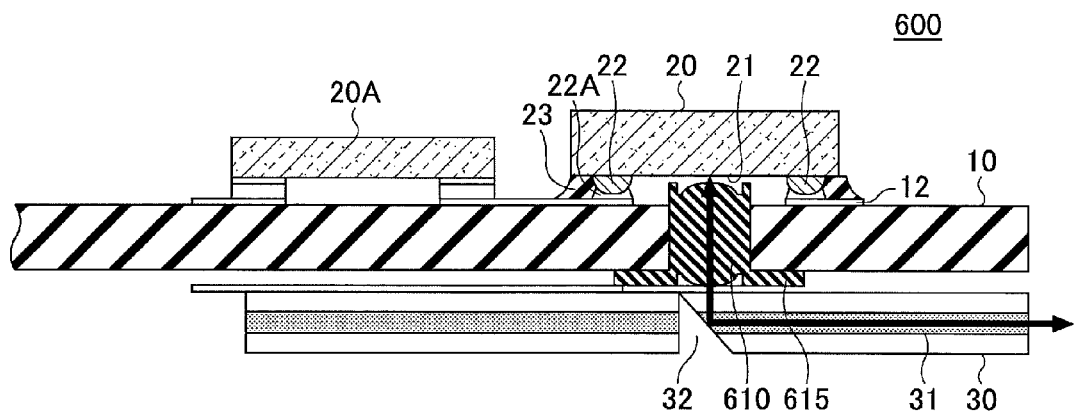
FIG. 7A is a cross-sectional view of an optical communication apparatus 600 of a sixth embodiment.
Figure 7B:
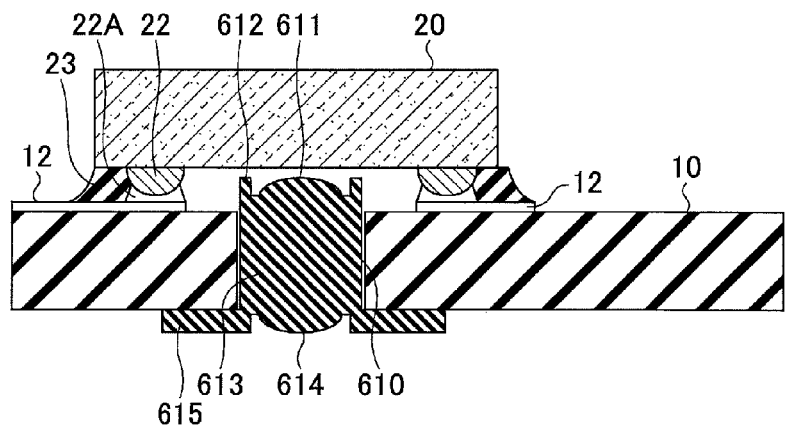
FIG. 7B is a cross-sectional view of the optical communication apparatus 600 of the sixth embodiment.
Figure 7C:
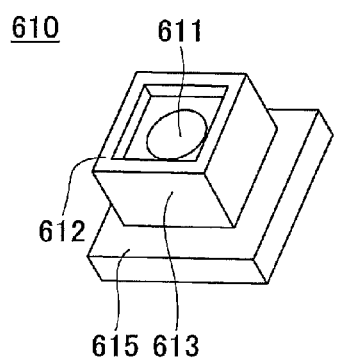
FIG. 7C is a perspective view of a lens of the sixth embodiment.
Figure 7D:
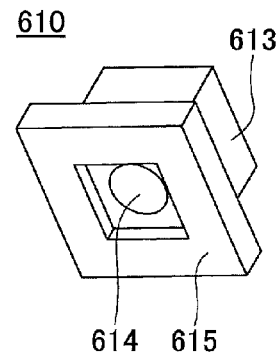
FIG. 7D is a perspective view of the lens of the sixth embodiment.

As illustrated in FIG. 7A, the optical communication apparatus 600 includes the substrate 10, the optical element 20, the light waveguide 30, and a lens 610. In the optical communication apparatus 600, the lens 410 of the fifth embodiment is replaced by the lens 610.

Referring to FIGS. 7A-7D, the lens 610 includes a lens portion 611, a surrounding portion 612, a guide portion 613, a lens portion 614, and a seat portion 615.

The lens portion 611, the surrounding portion 612, the guide portion 613, and the lens portion 614 correspond to the lens portion 511, the surrounding portion 512, the guide portion 513, and the lens portion 514. Within the sixth embodiment, the surrounding portion 612 and the guide portion 613 are shaped like a rectangular.

Further, the seat portion 615 is formed such that the plate 550 and the surrounding portion 415 of the fifth embodiment are integrally formed.

Further, the guide portion 613 is shaped like a quadratic prism, and therefore the through hole 11 of the substrate 10 is changed so as to be shaped like a quadratic prism.

As described, by providing the seat portion 615, in a manner similar to a case where the plate 550 of the fifth embodiment is used, it is possible to provide a further stable structure between the substrate 10 and the light waveguide 30.

Further, these shapes like the quadratic prism of the guide portion 613 and the through hole 11 of the substrate 10 facilitates a more stable installation of the lens 610 in the substrate.

Therefore, in a manner similar to the other embodiments, it is possible to prevent the sealing resin 23 from flowing into the through hole 11 because the surrounding portion 612 of the lens 610 interrupts the sealing resin 23.

Although the shapes of the guide portion 513 and the through hole 11 of the substrate 10 are like the quadratic prism in the above, the shape of the guide portion 613 and the through hole 11 of the substrate 10 may be a polygon such as a triangle, a pentagon, or a hexagon.

Seventh Embodiment

Figure 8A:
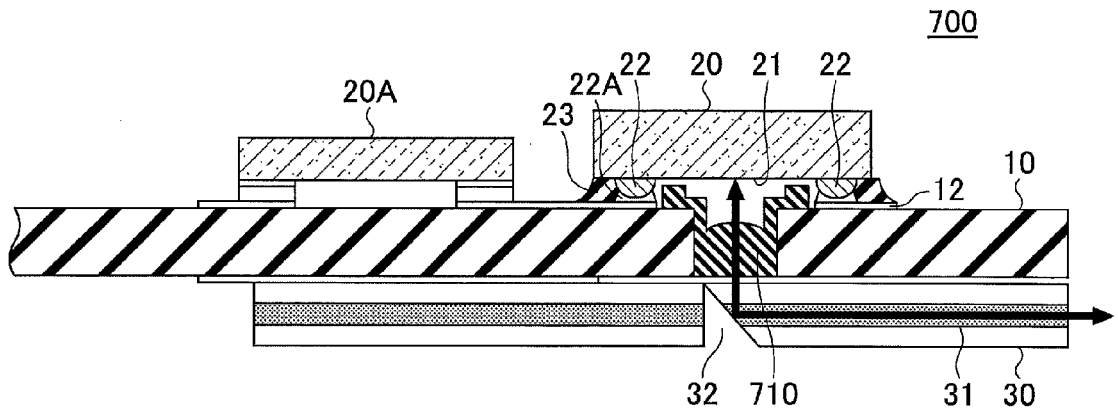
FIG. 8A is a cross-sectional view of an optical communication apparatus 700 of a seventh embodiment.
Figure 8B:
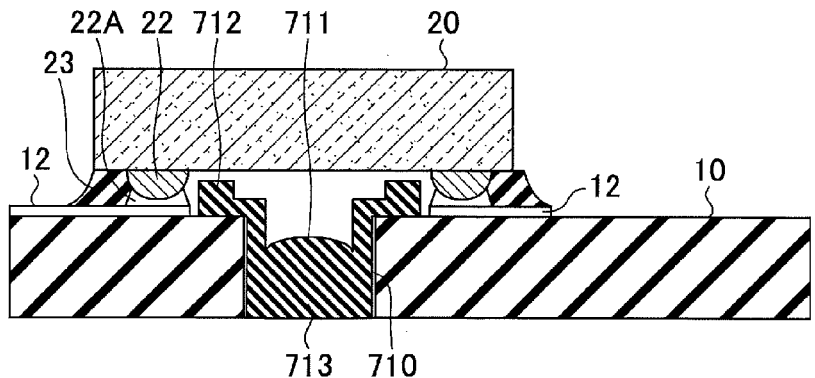
FIG. 8B is a cross-sectional view of the optical communication apparatus 700 of the seventh embodiment.
Figure 8C:
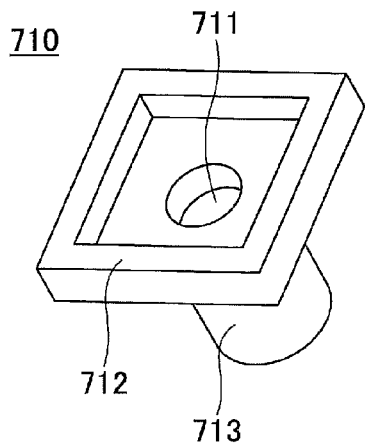
FIG. 8C is a perspective view of a lens of the seventh embodiment.

FIGS. 8A-8C illustrate an optical communication apparatus 700 of a seventh embodiment of the present invention. Hereinafter, the same reference symbols are attached to structural elements similar to those of the optical communication apparatus 100 of the first embodiment, and description of those structural elements is omitted.

As illustrated in FIG. 8A, the optical communication apparatus 700 includes the substrate 10, the optical element 20, the light waveguide 30, and a lens 710. In the optical communication apparatus 700 of the seventh embodiment, the lens 110 of the optical communication apparatus of the first embodiment is replaced by the lens 710.

Referring to FIGS. 8B and 8C, the lens 710 includes a lens portion 711, a surrounding portion 712, and a guide portion 713.

The lens 710 is structured such that the lens portion 111 of the lens 110 of the first embodiment is offset so as to be accommodated inside the through hole 11 of the substrate 10.

In the optical communication apparatus 700 of the seventh embodiment, a light path including the lens 710 is formed between the optical element 20 and the light waveguide 30.

In the optical communication apparatus 700 of the seventh embodiment, the surrounding portion 712 interrupts the sealing resin 23 when the optical element 20 is mounted on the substrate 10 using flip chip mounting. Therefore, unlike the exemplary optical communication apparatus 50, it is possible to prevent the sealing resin 23 from flowing into the through hole 11.

Therefore, within the seventh embodiment, the light path between the optical element 20 and the light waveguide 30 is prevented from being interrupted by the sealing resin 23, and the optical communication apparatus 700 having high reliability can be provided.

As described above, the optical communication apparatus according to the embodiments of the present invention may provide a high reliability.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the optical communication apparatus has been described in detail, it should be understood that the various changes, substitutions, and alterations could be made hereto without departing from the spirit and scope of the invention.

What is claimed is:

1. An optical communication apparatus comprising:
   a substrate having a through hole;
   an optical element which includes a light terminal for receiving or sending light and is mounted on a first surface of the substrate so that the light terminal faces the through hole;
   a light guide member which includes
      a first lens facing the light terminal,
      a surrounding portion which is integrally formed with the first lens so as to surround an outer periphery of the first lens, the surrounding portion including a wall protruding in a direction of an optical axis of the first lens toward the light terminal from the outer periphery of the first lens, and
      a guide portion which is provided inside the through hole and guides the light between an opening of the through hole and another opening of the through hole,
   the light guide member being formed of a single solid piece; and
   a light waveguide which is arranged on a second surface of the substrate and includes a light guide optically connected to the light guide member.

2. The optical communication apparatus according to claim 1,
   wherein the surrounding portion outwardly protrudes from the first surface toward the optical element.

3. The optical communication apparatus according to claim 1,
   wherein the surrounding portion has a height sufficient to form a gap between the surrounding portion and the optical element.

4. The optical communication apparatus according to claim 1,
   wherein the surrounding portion outwardly protrudes from the through hole in a plan view.

5. The optical communication apparatus according to claim 1,
   wherein the surrounding portion has a same size as the guide portion.

6. The optical communication apparatus according to claim 1,
   wherein the light guide further includes
      a second lens which is provided in vicinity of the second opening of the through hole and is optically connected to the light waveguide.

7. The optical communication apparatus according to claim 1,
   wherein the light guide member and the substrate are integrally formed.

8. An optical communication apparatus comprising:
   a substrate having a through hole;
   an optical element which includes a light terminal for receiving or sending light and is mounted on a first surface of the substrate so that the light terminal faces the through hole;
   a light guide member which includes
      a first lens facing the light terminal,
      a surrounding portion which is formed of a single solid piece with the first lens so as to surround an outer periphery of the first lens, the surrounding portion including a wall protruding in a direction of an optical axis of the first lens toward the light terminal from the outer periphery of the first lens,
      a guide portion which is provided inside the through hole and guides the light between an opening of the through hole and another opening of the through hole;
   a sealing resin portion which joins the optical element to the substrate; and
   a light waveguide which is arranged on a second surface of the substrate and includes a light guide optically connected to the light guide member.

* * * * *